US008100008B2

(12) United States Patent
Mentesh (10) Patent No.: US 8,100,008 B2
(45) Date of Patent: Jan. 24, 2012

(54) MEASURING CAP

(76) Inventor: William M. Mentesh, Roseville, CA (US)

( * ) Notice: Subject to any disclaimer, the term of this patent is extended or adjusted under 35 U.S.C. 154(b) by 270 days.

(21) Appl. No.: 12/349,762

(22) Filed: Jan. 7, 2009

(65) Prior Publication Data
US 2009/0193890 A1 Aug. 6, 2009

Related U.S. Application Data

(60) Provisional application No. 61/088,865, filed on Aug. 14, 2008, provisional application No. 61/025,643, filed on Feb. 1, 2008.

(51) Int. Cl.
*G01F 19/00* (2006.01)
(52) U.S. Cl. .......................................................... 73/427
(58) Field of Classification Search ...................... 73/427
See application file for complete search history.

(56) References Cited

U.S. PATENT DOCUMENTS

| 219,349 | A | * | 9/1879 | Dierking ........................ 222/158 |
| 986,270 | A | * | 3/1911 | Daniels .......................... 215/365 |
| 1,780,875 | A | | 11/1930 | Gordon |
| 2,804,103 | A | | 8/1957 | Wall |
| 4,227,617 | A | * | 10/1980 | Albrecht et al. ............... 215/251 |
| 4,416,381 | A | * | 11/1983 | Swartwout ..................... 215/228 |
| 5,487,494 | A | * | 1/1996 | Robbins, III .................. 222/158 |
| 5,509,582 | A | * | 4/1996 | Robbins, III .................. 222/158 |
| 5,542,579 | A | * | 8/1996 | Robbins, III .................. 222/158 |
| 5,632,417 | A | * | 5/1997 | Robbins et al. ............... 222/158 |
| 5,662,249 | A | * | 9/1997 | Grosse ........................... 222/461 |
| 6,543,284 | B2 | * | 4/2003 | Hoeting et al. ................. 73/427 |
| 7,562,771 | B2 | * | 7/2009 | Fontana ......................... 206/222 |
| 2006/0054240 | A1 | * | 3/2006 | Perry ............................... 141/95 |
| 2006/0213375 | A1 | * | 9/2006 | Moline ........................... 99/495 |
| 2007/0290009 | A1 | * | 12/2007 | Fuchs ........................... 222/480 |
| 2008/0011710 | A1 | | 1/2008 | Cohn |
| 2008/0116164 | A1 | | 5/2008 | Dellinger |
| 2009/0193890 | A1 | * | 8/2009 | Mentesh ......................... 73/427 |

FOREIGN PATENT DOCUMENTS

| CA | 002506459 A1 | 12/2003 |
| EP | 0447091 B1 | 12/1994 |
| GB | 2345905 A | 7/2000 |

* cited by examiner

*Primary Examiner* — Lisa Caputo
*Assistant Examiner* — Jamel Williams
(74) *Attorney, Agent, or Firm* — Edward S. Sherman (57) ABSTRACT

A cap for a bottle that may be used as a means to measure liquid or flowable contents being poured from a bottle. The portion of the cap used for measuring is inclined upward to its rim for accurate measurement and reading of the numbers and/or other markers. The opposite side of the measuring portion has an upright surrounding wall that extends from the rim, to form a second fluid retaining volume or storage area when covered with an optional top.

21 Claims, 11 Drawing Sheets

MEASURING CAP

CROSS REFERENCE TO RELATED APPLICATIONS

The present application claims priority to the U.S. provisional application, having Ser. No. 61/088,865, filed on Aug. 14, 2008, which is incorporated herein by reference.

The present application also claims priority to the U.S. provisional application, having Ser. No. 61/025,643 filed on Feb. 1, 2008, which is also incorporated herein by reference.

BACKGROUND OF INVENTION

The present invention relates generally to bottle caps and more specifically it relates to a Measuring Cap, and more specifically to cap that may be used for both measurement and storage apart from the bottle or container which it closes.

U.S. Pat. No. 1,780,875 issued to Gordon on Nov. 4, 1930 teaches a bottle cap that can be used as a measuring device, having graduations and a pouring spout when removed from the bottled. U.S. Pat. No. 2,804,103 issued to Wall on Aug. 27, 1957 also teaches a bottle cap that can be used as a measuring device. However, the gradations on these caps are not convenient to read while pouring fluid into the cap, as the cap must be kept at eye level when being filled.

US Pat. Application No. 2008/0011710 A1 which published on Jan. 17, 2008, teaches a bottle cap with screws that has the general size and shape of a shot glass, but provides no other measurement means than total volume of the glass.

In light of the deficiencies of this and other prior art, a first object is to provide a measuring cap for a bottle or container that can more conveniently be used as a means to measure liquid or flowable contents being poured from the bottle.

Another object is to provide a measuring cap that serves additional purposes, which though described below are part of the applicants invention, and hence should not be construed as being admitted as prior art merely from the inclusion in this background section of the application One such object is to provide a measuring cap that includes a second volume that can be used for measurement or storage, being on the opposite side of the principle fluid retaining surface, in the upper portion of the cap, that seals the bottle or container and provides the primary measurement volume Another object is to provide a measuring and storage cap that has a lid that is located at the upper portion of the cap.

Another object is to provide a measuring and storage cap that has a storage area self-contained within the cap, being accessible via the lid.

Another object is to provide a measuring and storage cap that may be used to measure liquid or flowable contents by turning the cap upside down, pouring liquid or flowable contents inside an internal container and measuring the desired amount based on the indicia in the container.

Another object is to provide a measuring and storage cap that measures liquid or flowable portions, which portions may be poured into a separate container to mix with other contents, liquid, dry or otherwise.

Another object is to provide a measuring and storage cap that measures full shots or more of liquor, which shots may be poured into a glass to make a mixed drink.

Another object is to provide a measuring and storage cap that provides a means to extract a stored item from the storage area in the cap, which item may then be used accordingly.

Another object is to provide a measuring and storage cap that provides a means to extract a stored item from the storage area in the cap that may be used in the process of mixing a drink.

Another object is to provide a measuring and storage cap that provides a means to extract a stored item from the storage area in the cap that may be used along with the premeasured liquid or flowable contents in the bottle, in yet a third container.

Another object is to provide a measuring and storage Cap that provides a means to extract a stored item from the storage area in the cap that may be put inside the bottle with the contents therein.

Other objects and advantages of the present invention will become obvious to the reader and it is intended that these objects and advantages are within the scope of the present invention. To the accomplishment of the above and related objects, this invention may be embodied in the forms illustrated in the accompanying drawings, attention being called to the fact, however, that the drawings are illustrative only, and that changes may be made in the specific constructions illustrated and described within the scope of this application

SUMMARY OF INVENTION

The invention generally relates to a bottle (or container), a measuring cap with an internal container, a storage area, and a lid. Utilizing the various attributes in the present invention provides a user with a convenient system to measure and concoct various formulas in various combinations.

There has thus been outlined, rather broadly, some of the features of the invention in order that the detailed description thereof may be better understood, and in order that the present contribution to the art may be better appreciated. There are additional features of the invention that will be described hereinafter.

In one aspect, at least some of the aforementioned objects of the invention are achieved by providing measuring cap, comprising an inner threaded cylinder of a first vertical height having a closed top and a bottom rim, an inclined annular surface extending downward a second vertical height from the bottom rim of said inner threaded cylinder, terminating at the first lower rim, a surrounding outer wall having an upper rim and second lower rim coupled to the lower rim of the inclined annular surface in sealed connection thereto, and also having a third vertical height that is at least equal to the sum of the first and second vertical height to define an outer fluid containing vessel when the measuring cap is resting on the second lower rim, wherein the inner threaded cylinder and the inclined annular surface form an inner fluid containing vessel when the measuring and storage cap is resting on the upper rim.

In another aspect, at least some of the aforementioned objects of the invention are achieved by providing a measuring cap, comprising an inner threaded cylinder of a first vertical height having a closed top and a bottom rim, an inclined annular surface extending downward a second vertical height from the bottom rim of said inner threaded cylinder, terminating at the first lower rim, a surrounding outer wall having an upper rim and second lower rim coupled to the lower rim of the inclined annular surface in sealed connection thereto, and also having a third vertical height that is at least equal to the sum of the first and second vertical height.

In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

The above and other objects, effects, features, and advantages of the present invention will become more apparent from the following description of the embodiments thereof taken in conjunction with the accompanying drawings.

DETAILED DESCRIPTION

Referring to FIGS. 1 through 11, wherein like reference numerals refer to like components in the various views, there is illustrated therein a new and improved Measuring Cap, generally denominated 20 herein. Turning now descriptively to the drawings, in which similar reference characters denote similar elements throughout the several views, the figures illustrate a bottle, a measuring cap with an internal container, a cap storage area, and a lid.

Figure 1:
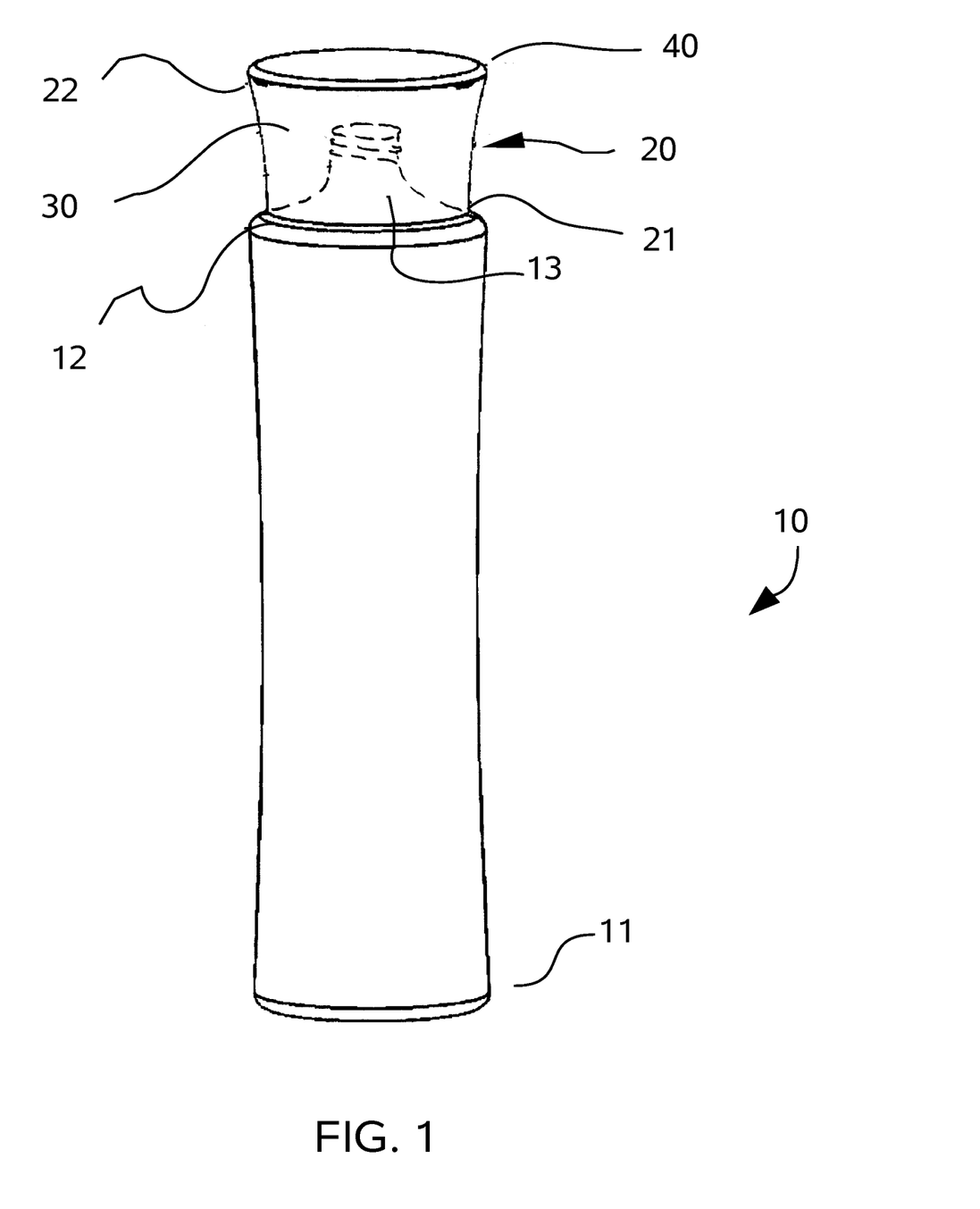
FIG. 1 is an upper perspective view of the bottle and cap of the present invention.

Bottle: As illustrated in FIG. 1, the bottle 10 may be of any typical construction commonly used in industry, with a base 11, a top shoulder 12, and a bottle neck 13 and contains liquid or flowable contents. Measuring cap 20 has a base 21 and an upper edge 22, and seals off the contents of bottle 10 in a typical threaded bottle cap configuration. However, inside measuring cap 20 is internal container 23 (not illustrated in FIG. 1) which can be used for measuring. Optionally, and also inside cap 20, consuming the opposing space occupied by internal container 23 is storage area 30, which is optionally in turn is sealed at the top by lid 40. When the lid 40 is removable, the storage area 30 is accessible. The cap and bottle combination illustrated herein may be in any number of combinations and designs. Instead of a bottle a container made of a carton, plastic liner or otherwise may suffice. Instead of a cap as illustrated, it may be in any number of forms for example, but not limited to large, thermos-style lids or wide, elongated, dish-shaped caps, and so on.

Figure 2:
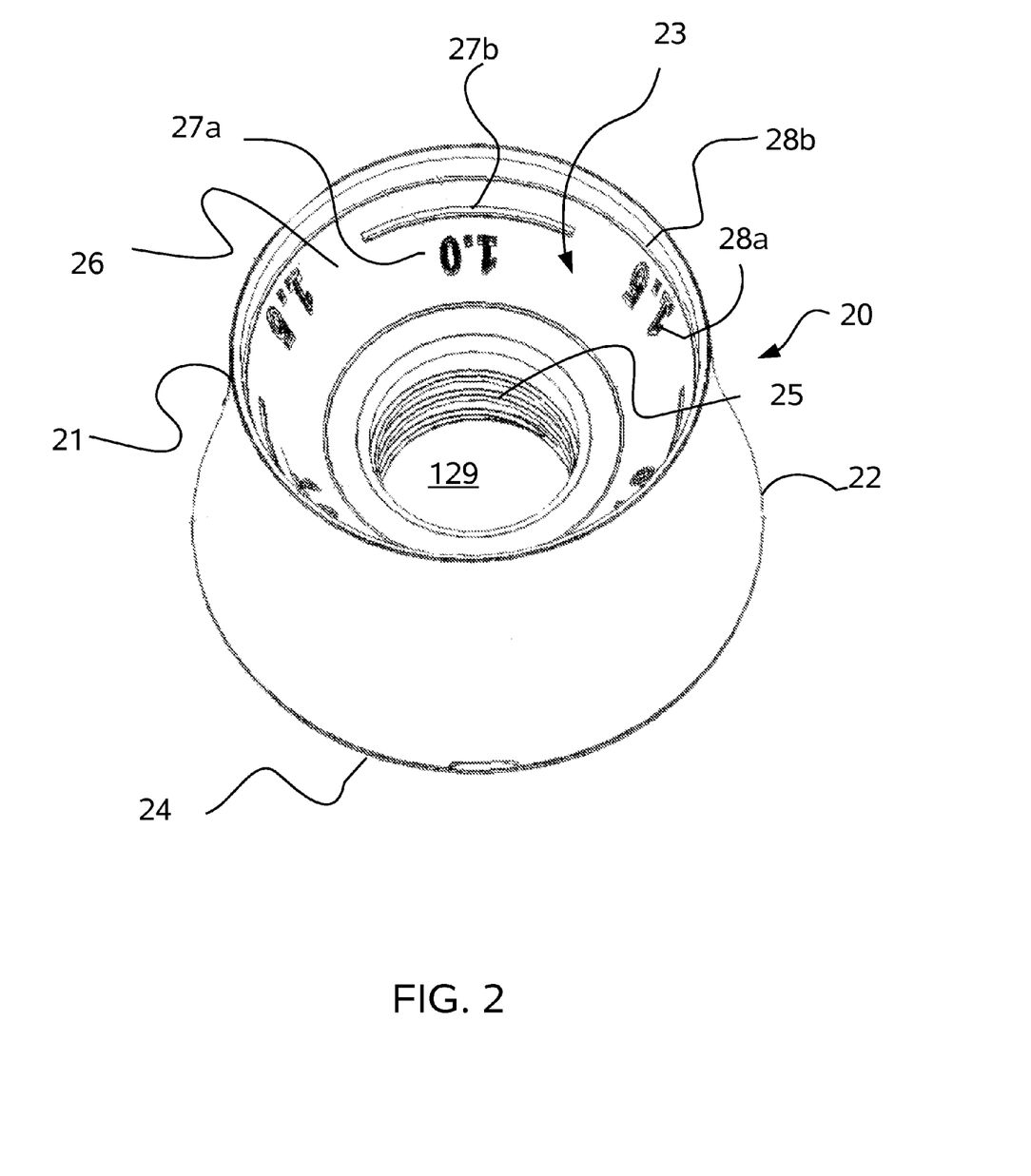
FIG. 2 is a perspective view of the cap turned upside down illustrating the internal container and the indicia that may be used for measuring.

Measuring Cap: As illustrated in FIG. 2, measuring cap 20 is inverted and is comprised of a base 21 (now it is positioned as the uppermost edge), an upper edge 22 which now defines the edge of a base, which base may rest on a level surface, and inside has an internal container 23 that is used to measure liquid or flowable contents. In this inverted position internal container 23 is defined by base 24, lower threaded wall 25, and an upper wall 26. As the upper threaded wall 25 is sealed by top 129.

The internal container 23 is suitably designed with predetermined measuring points defined by indicia 27a and 27b (hash marks), and 28a and 28b (illustrated as a solid delineation line), respectively, which indicia in this example are placed on upper wall 26. There is no restriction on the shape and formation of this type of cap and its internal container. The indicia used for measuring may be one or two gradients or many more incremental amounts and may be made by any number of means such as a score line, a ridge defined during molding, printed means, labels, and so on. Unlike US 2008/0116164 (US '6164) Dellinger, which is virtually identical to caps used with several common liquid soap containers, the present invention is far more versatile with a larger internal container extending past the threaded bottle neck and with indicia allowing the user to determine the amount liquid or flowable content desired-instead of guessing. US '6164 is limited to the use as a shot glass whereas the present invention has a broader application and versatility. Similarly, the invention described in US 2008/0011710, Cohn, illustrates a shot glass cap that has its predetermined internal container in a configuration that serves only the purpose of being used as a shot glass. The ability to measure flowable contents from a bottle or container is becoming more desirable as new uses arise. For example, various types of liquor drinks may use 1 or 1.5 shots of liquor.

Figure 4:
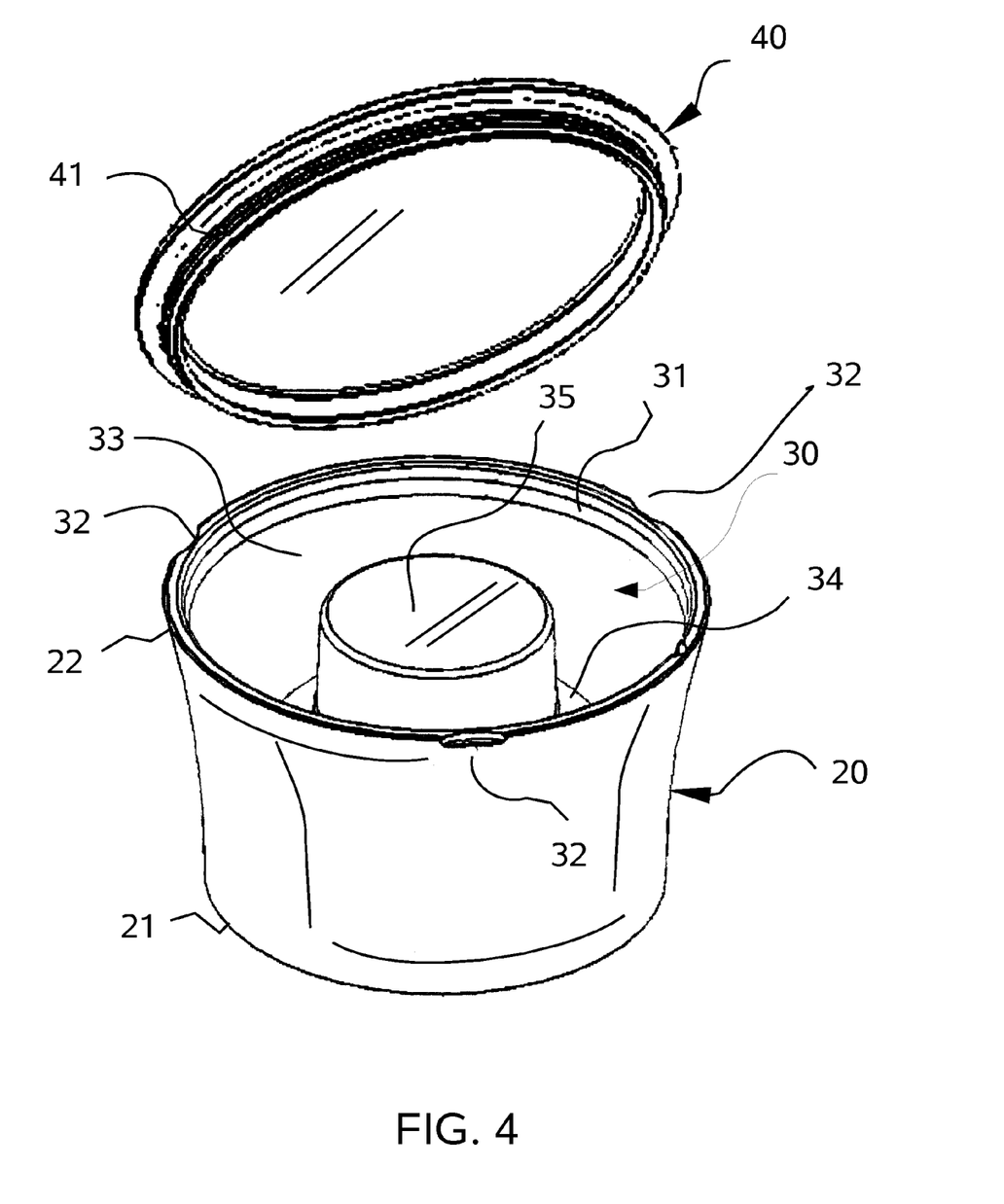
FIG. 4 is an upper perspective view of the cap, inverted from FIGS. 2 and 3, illustrating a removable lid and the underlying storage area.

Measuring Cap Storage Area: As shown in FIG. 4 cap 20 also has a storage area 30 that may contain additional items to be added to a mixture. Storage area 30 lies generally atop the internal container, when cap 30 is in its upright position and is typically covered by lid 40. The girth and width of the cap pf the present invention would depend upon various factors such as the type of liquid or content to be measured and how it would facilitate the subsequent pouring process. Any number of imaginable configurations and dimensions may be used providing the internal container is of sufficient girth for a user to see, and therefore use, the measurement indicia.

Lid: Illustrated in FIG. 4, lid 40 typically covers the top of the cap and is used to close up or open up the underlying storage area. The combination of lid 40 and storage area 30 may be in any number of configurations including snap-on lids, screw-on lids, tongue and groove, and so on. The lid may or may not remain attached to the cap after it has been opened. The contents therein may be in any imaginable form or type.

Operation of Preferred Embodiment: In FIG. 1 bottle 10 has a base 11, an upper shoulder 12, and screw top neck 13. Bottle cap 20 has a base 21, upper edge 22, and an internal container 23. Inside lid 20 is measuring cap storage area 30. Openable lid 40 is securely attached to cap 20 at the adjacent upper edge 22. As illustrated in FIG. 1, bottle 10 may be any number of commonly used containers, such as those used for liquor, liquid and dry soaps, or any number of chemicals, sauces or compounds. The advantage of having cap 20 suitable for measuring eliminates the need for additional measuring devices.

In FIG. 2 cap 20 has been inverted illustrating internal container 23 (the space defined inside), defined with a base 24, threads defining a lower wall 25, and an upper wall 26. On upper wall 26 is indicia 27a defining a measurement of 1.0 unit with its corresponding hash mark 27b, and indicia 28a defining a measurement of 1.5 units with its corresponding delineation line 28b. To use, a user unscrews cap 20 from bottle neck 23, inverts cap 20 as illustrated and pours the liquid or flowable contents to be measured into the internal container 23. The liquid or flowable contents would usually come from the bottle itself and after measuring, be poured into a separate container. For example, a user would perform this operation to mix 1.5 oz. of vodka and then pour the contents into a glass to be subsequently mixed with tonic water. Similarly, a liquid or flowable content from an external source may be mixed into internal container 23, which in turn may be poured into the bottle thereby altering the make-up of the bottle's contents. This may be useful to blend certain ingredients such as adding spices to a salad dressing or added catalyst to a plastic resin. Unlike prior art, the present invention makes this type of measuring operation quick and easy. It goes without saying that measuring cap 20 may be made of any number of materials such as plastic, metal, glass and so on. With indicia 27a and 27b, and 28a and 28b, clearly marked inside the internal container 23 and easily readable, the user can quickly, conveniently, measure a desired amount and pour it out. Because of the narrow shot-glass configuration of both the '1170 and the '6164 publications, providing indicia and attempting to measure a flowable content would be extremely difficult, if at all possible.

Figure 3:
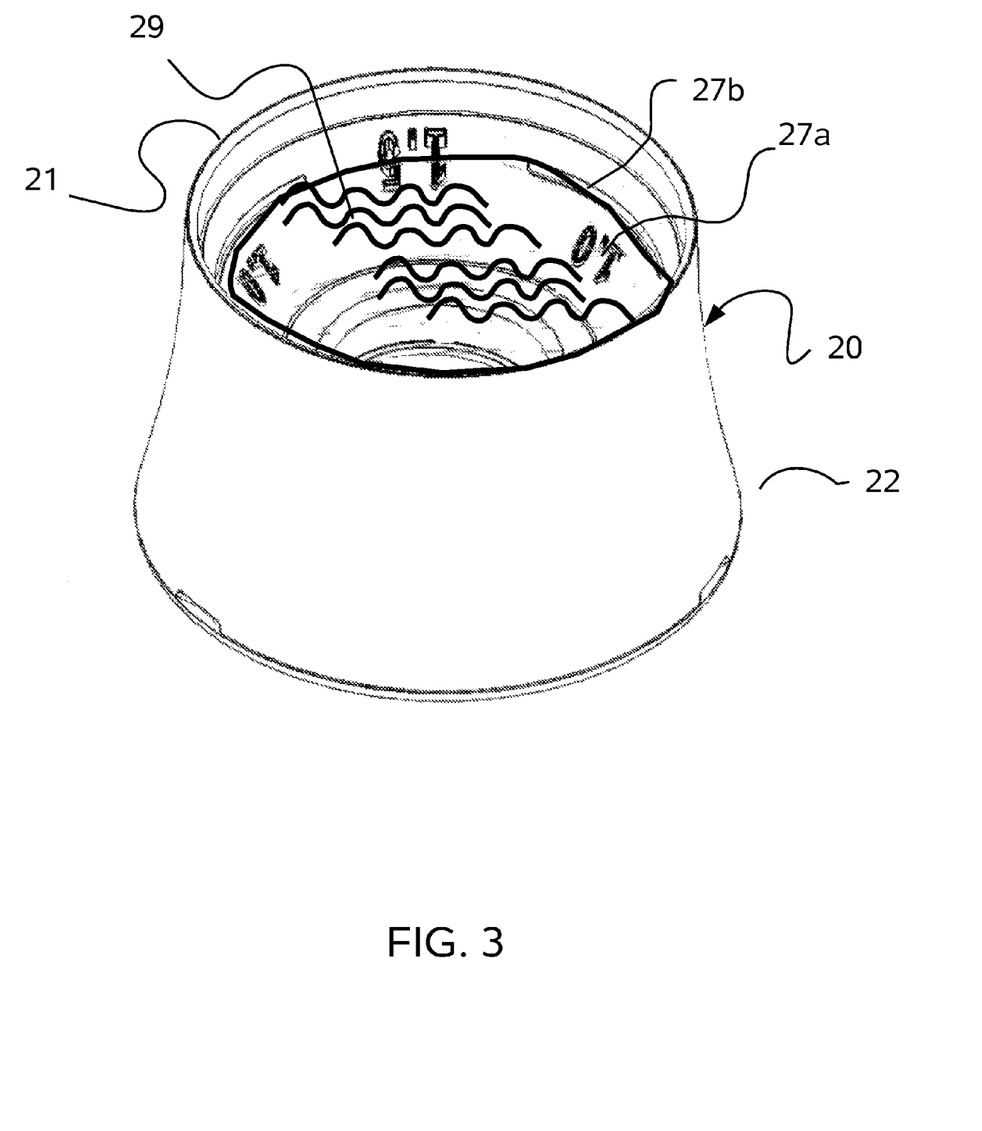
FIG. 3 is an upper perspective view of the cap of the present invention turned upside and containing a liquid.

In FIG. 3 inverted cap 20 is shown filled with liquid 29 that has been measured up to the 1.0 unit hash mark 27b.

In FIG. 4, cap 20 sits upright with lid 40 removed thereby exposing measuring cap storage space 30. Measuring cap storage space 30 is defined by an upper thread ring 31 that receives lid thread 41 of lid 40, slots 32 adjacent upper thread ring 31 suitable for a user to pry off cap 40 with the fingertips, storage area wall 33, a base 34, and a middle, upward protrusion 35, being the reverse side of the threaded wall 25 in FIG. 2 and FIG. 5. Upward protrusion 35 then which connects to the base 34 by an annular sloped or curved wall 526, being the reverse side of upper wall 26 of the internal container 23. Items (contents) may be stored in the measuring cap storage area 30 and added to the mix as desired. The additional contents may come in any number of forms such as liquid, pellets, chemicals, salts, and so on. When a user places his/her finger tips under slots 32 on cap 20, lid 40 may be quickly opened and/or removed thus providing access to storage area 30 underneath. Once opened the user may extract a stored item (contents) and adds it to the mixture or use otherwise. After extracting the desired contents, the lid 40 is simply snapped back in place, screwed back on or otherwise. Together the bottle 10, cap 20 with its internal container 23, storage area 30 and lid 40 provide a convenient, self-contained measuring system. An example of their use may be a user who is preparing a mixed liquor drink that requires 1.5 shots of vodka and a slice of lime. The vodka is measured in the internal container 23 and the lime is extracted from the cap storage area 30.

Figure 5:
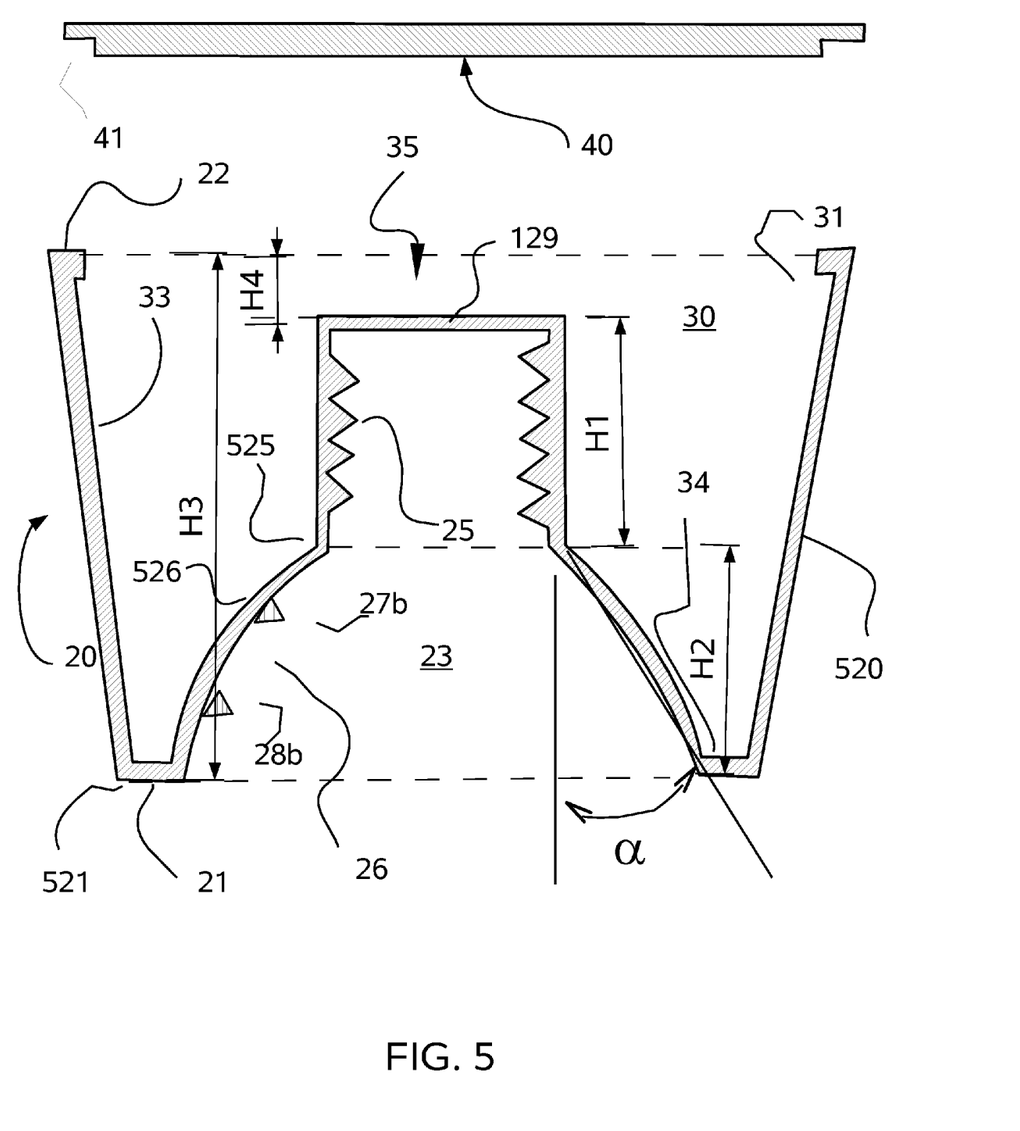
FIG. 5 is a cross-sectional elevation of another embodiment of the cap and top.

FIG. 5 illustrates the prior embodiment of the invention in a cross sectional elevation to better define various preferred embodiments. The cap 20 can be considered to comprise an inner threaded cylinder 25 of a first vertical height (H1) having a closed top 129 and a bottom rim 525 with a tilted or inclined and outward extending annular surface 26 proceeding downward a second vertical height (H2) from the bottom rim 525 of inner threaded cylinder 25, terminating at the first lower rim 21. A substantially cylindrical outer wall 520 (defining storage area wall 33) having an upper rim 22 and second lower rim 521 is coupled to the lower rim 21 of the tilted annular surface 26 in sealed connection with a third vertical height (H3) that exceed the sum of the first and second vertical height (i.e. H3>H1+H2) to define an outer fluid containing vessel 30 when the measuring and storage cap is resting on the second lower rim 521 or rim 21, wherein the inner threaded cylinder 25 and the tilted annular surface 26 form an inner fluid containing vessel 23 when the measuring and storage cap is resting on upper rim 22.

It should be appreciated from the foregoing description that the outer fluid containing vessel 30 will have a wider rim than the in fluid containing vessel. However, depending on the diameter of the rim 21, and the difference in height between H3 and the sum of H1 and H2, the volume of the inner vessel 23 and outer vessel can be comparable, or on can be much greater than the other. While it is generally preferred developed so that volumes are comparable, one may be considerably larger than the other depending on the intended end use of each vessel or compartment. For example the outer vessel 30 may be configured to store salt or sugar that is used to decorate the rim of a drinking glass, rather than another liquid or for measurement purposes. If the outer vessel is used for measurement purposes, volumetric gradations may be placed on any of the horizontal, inclined or vertical surface. Such gradations in either the inner container 23 or outer container 30 may take the form of lines, or discrete steps, or transition in shape, such as rim 525. In the case of steps, volume may be printed on the horizontal portion of the steps, as either numbers, letters or symbols, as well as in the same format on any other portion.

Figure 7:
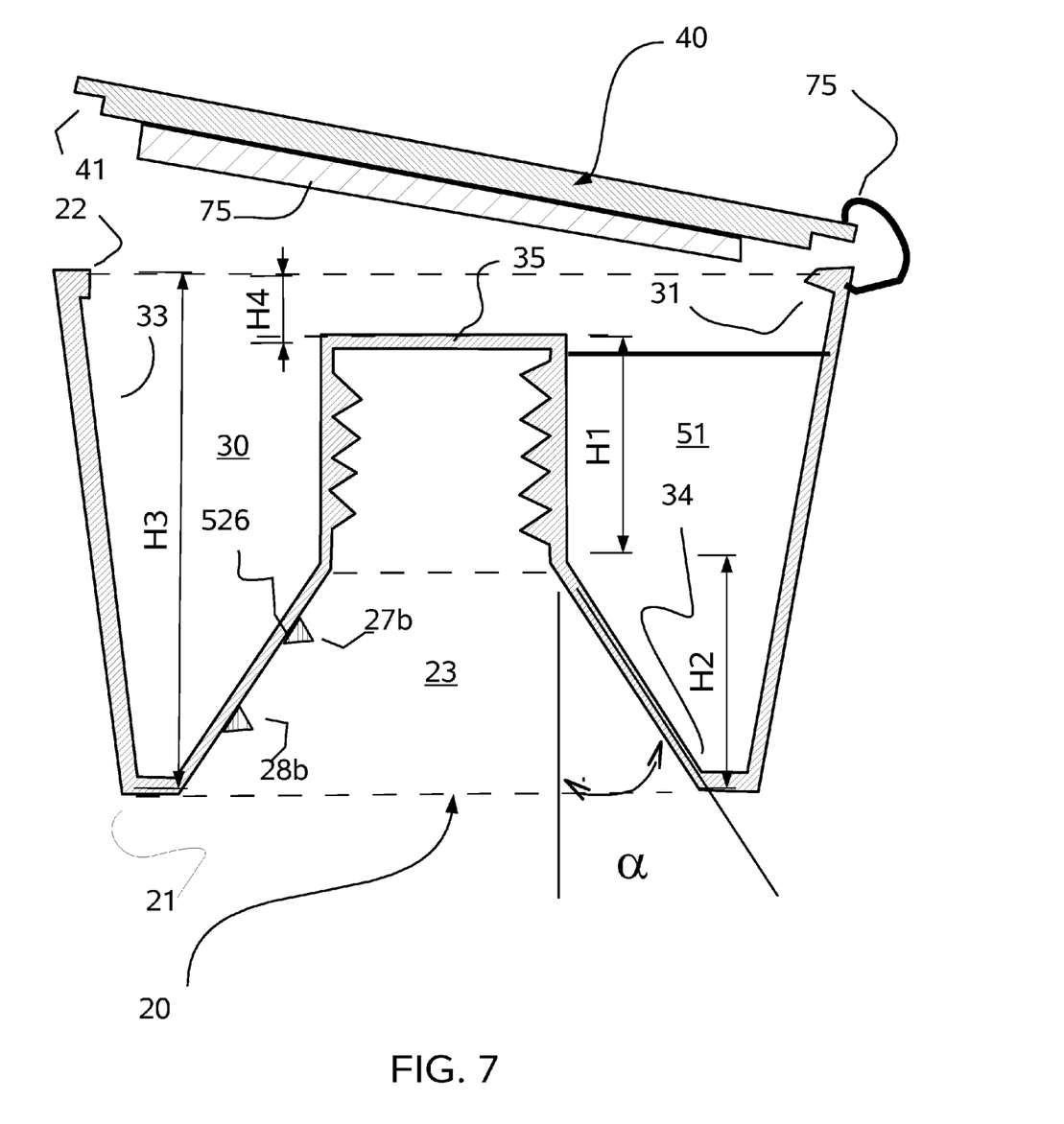
FIG. 7 is a cross-sectional elevation of a further embodiment of the cap and top.

The lid 40 can be removable, or attached, or removable, but attached by tether or hinge 75, as shown in FIG. 7. Further, in additional embodiments, the lid may contain a mirror 71 on either the internal, external or both surfaces.

Figure 6:
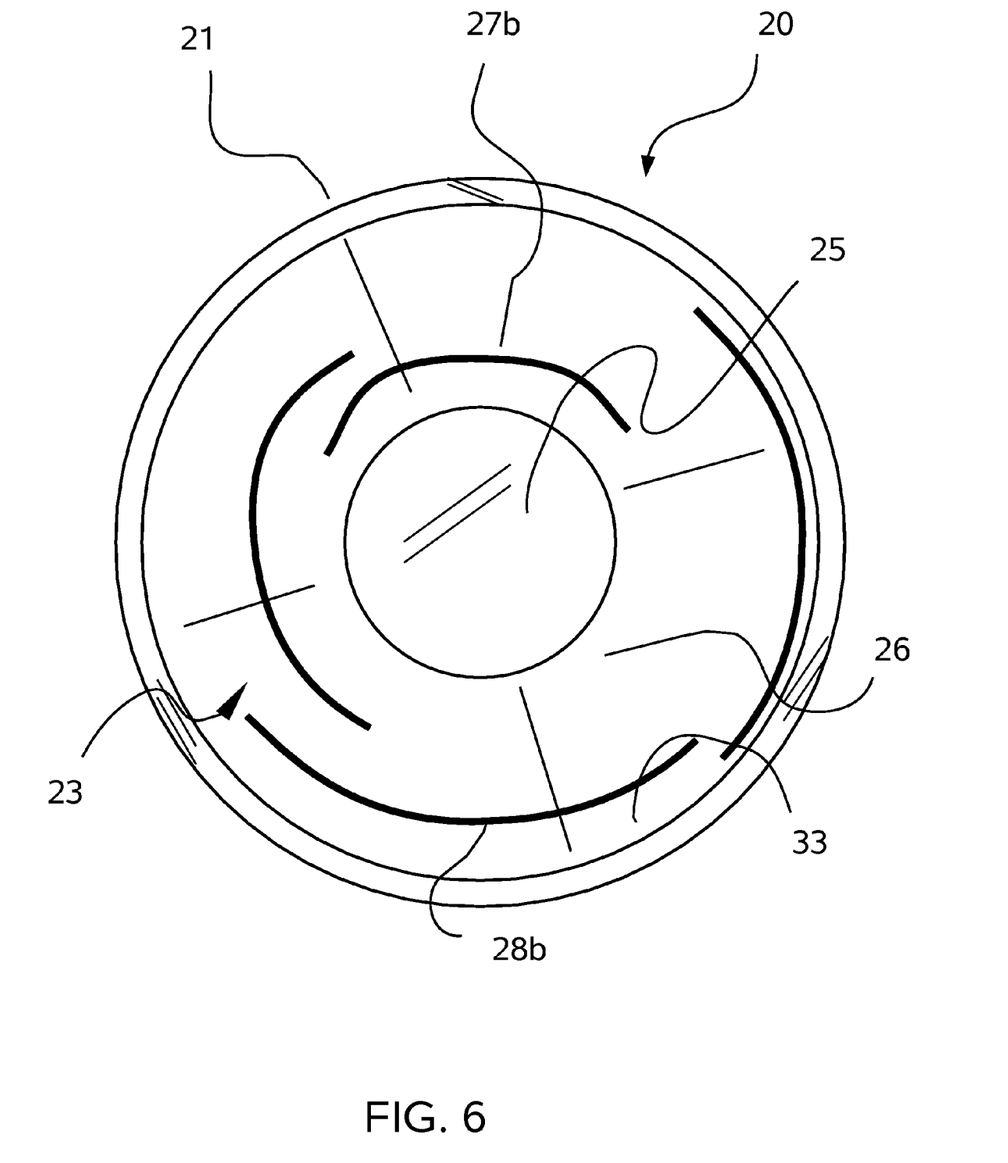
FIG. 6 is a bottom plan view of the cap in FIG. 5.

The tilted or inclined annular surface 26 is optionally curved inward or outward, or is straight as shown, but is preferably disposed at an inclination angle α that is at least about 30°, but more preferably greater than about 40° and most preferably greater than about 45°. The higher inclination angle has several advantages. First, it reduces splashing when fluid is poured in from the bottle 10. Second, the incline spaces apart the gradation lines and markings 27 and 28, making them easier to read and distinguish from above. In particular, the concave incline annular surface of FIG. 5 reduces the height of the fluid meniscus, as the flatter the fluid produces less reading and accuracy error by making it easier to observe the fluid edge and align it with measuring lines 27b and 28b when viewed from above, as shown in FIG. 6 (which is a bottom plan view of the cap 20 in FIG. 5) Further, as the meniscus consumes less of the total fluid volume the accuracy is increased.

Figure 8:
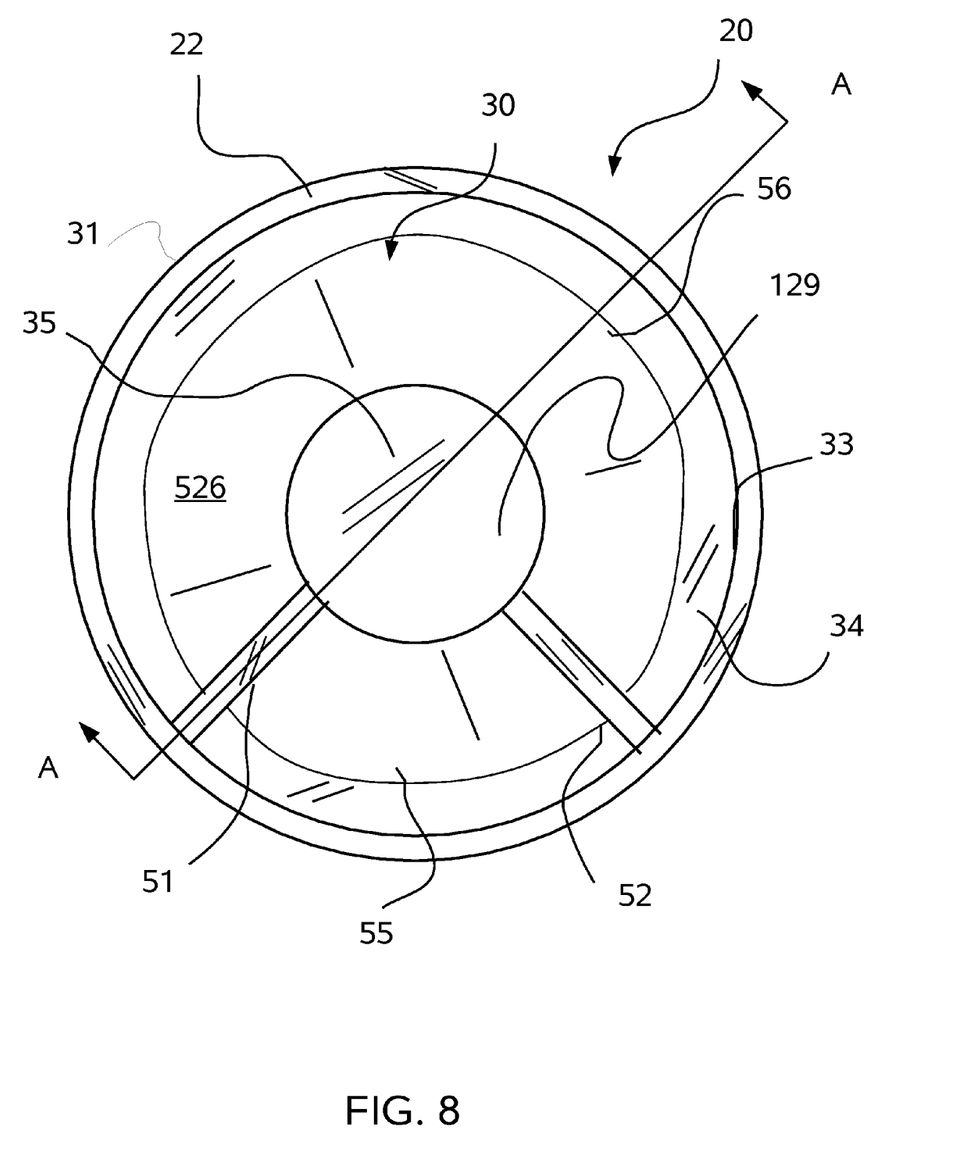
FIG. 8 is a top plan view of the cap in FIG. 7

FIG. 8 is a top plan view of another alternative embodiment of the cap 20 from above with the top 40 removed. This embodiment now includes walls 51 and 52 that subdivide the vessel 30 into compartments 55 and 56. FIG. 7 is a cross-sectional elevation of the embodiment of FIG. 7 taken through wall 51 at section line A-A in FIGS. 8, 9 and 10. The top of wall 51 can either extend until rim 22 to completely seal each compartment 55 or 56 when top 40 is attached, or be below rim 22 as shown.

Figure 9:
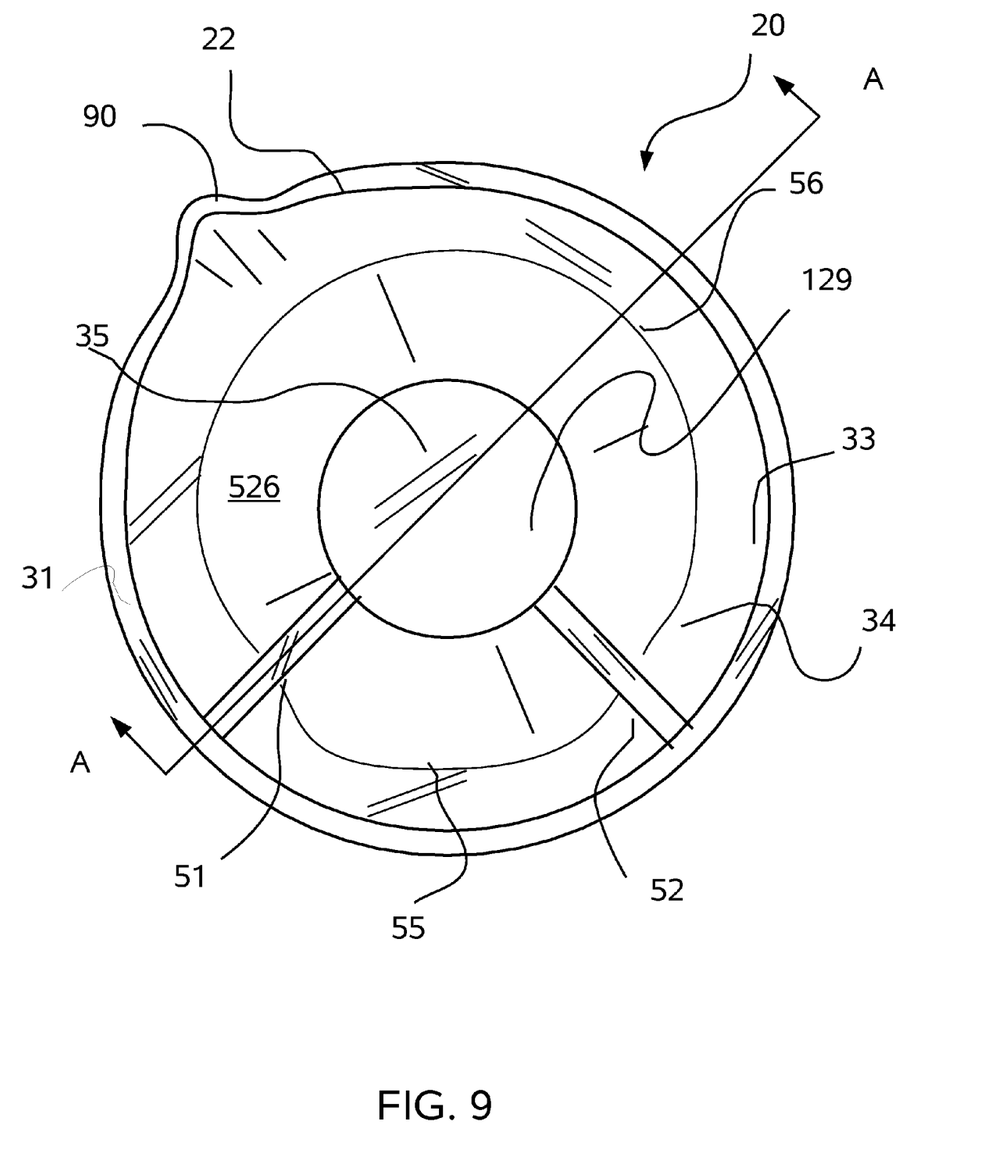
FIG. 9 is a top plan view of yet another embodiment of the cap.

FIG. 9 is a top plan view of another alternative embodiment of the cap 20 from above with the top cap removed to show pouring spout 90 formed in the outer wall.

Figure 10:
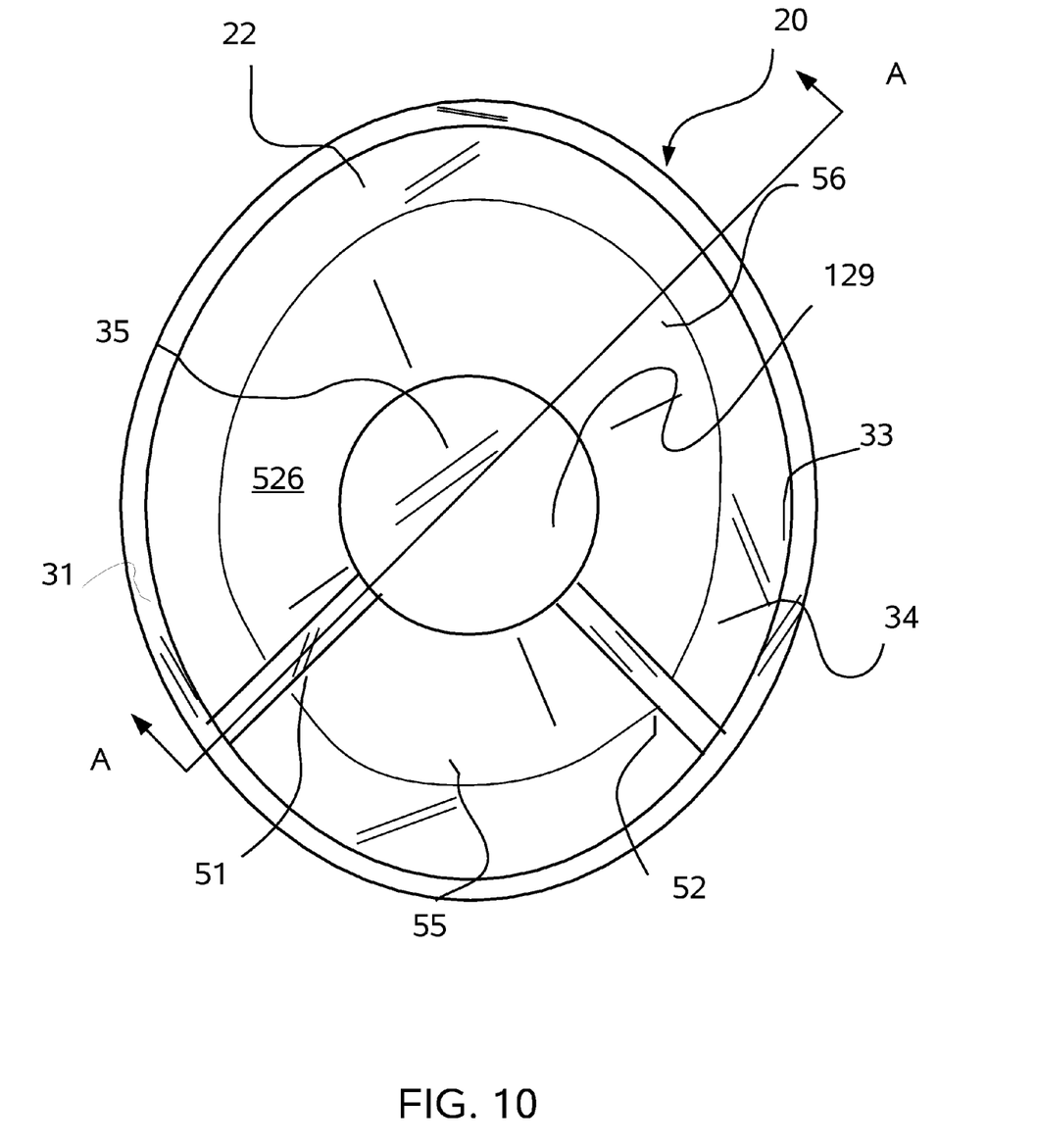
FIG. 10 is a top plan view of a still further embodiment of the cap.

FIG. 10 is a top plan view of another alternative embodiment of the cap 20 from above with the top 40 removed to show that vessel 30 has a parabolic or oblong shape, rather than the cylindrical shape.

Figure 11A:
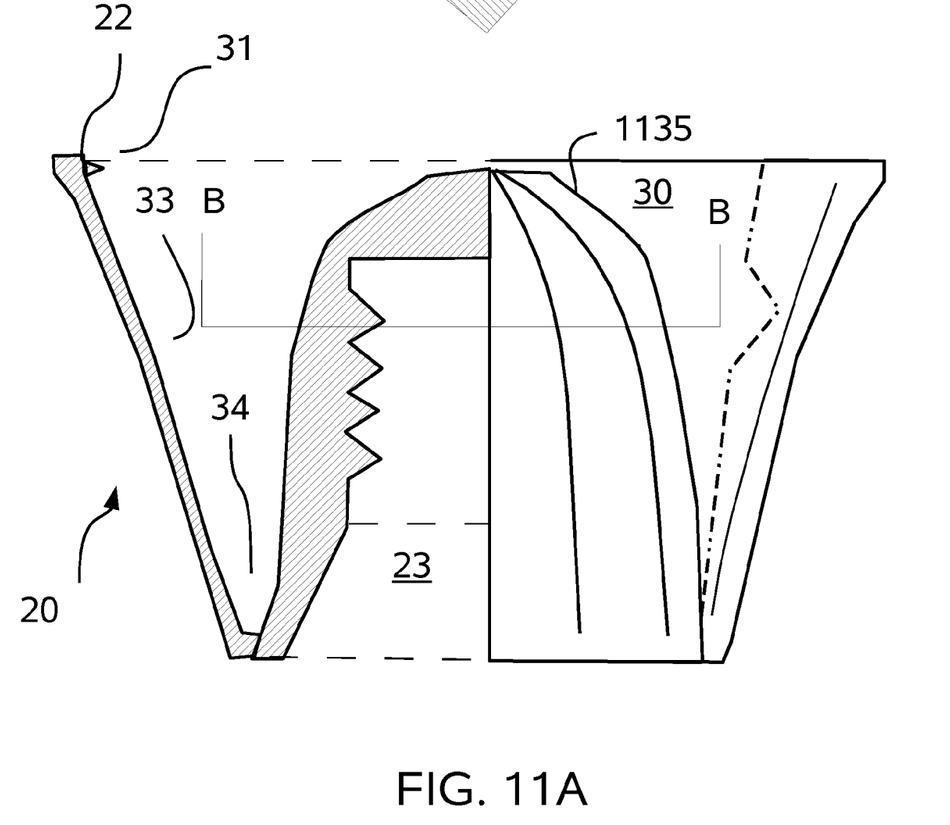
FIG. 11A is a partial cut-away view and section through another embodiment of the cap.
Figure 11B:
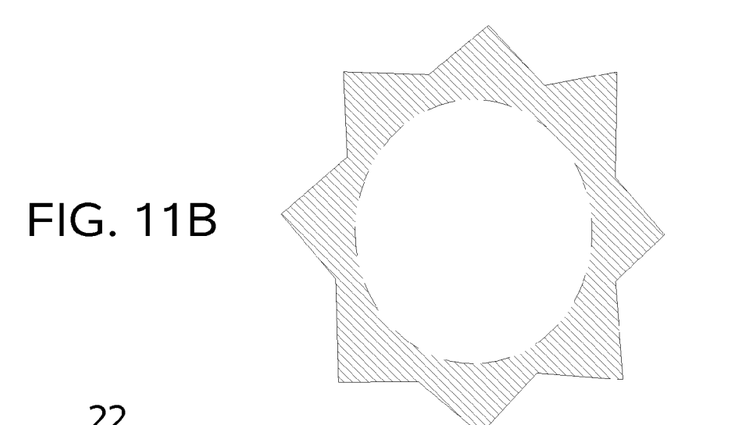
FIG. 11B is a section of the cap in FIG. 11A at section line B-B.

FIG. 11A is a partial cut-away view and section through another embodiment of the cap wherein upward protrusion 35 and an annular sloped or curved wall 526 of the other embodiments are united to form a segmented convoluted cone 1135 that is useful for extracting juice from citrus fruit. This convoluted cone can have straight sides or the convex curved sides that are shown. The apex of the cone can be above, below or even with the rim 22. The cap 40 is not essential to this embodiment, but when deployed can be domed to accommodate the apex extending above rim 22. The right side portion of the cap 20 in FIG. 11A is an external elevation with a portion of the outer wall removed to show the citrus juicing cone 1135, whereas the left side is the symmetrical cross-sectional elevation. FIG. 11B is a section of the cap in FIG. 11A at section line B-B to show the general form of the convolutions, which in this plan section have star like shape. It is also preferable that this embodiment include the pouring spout 90 of FIG. 9 for pouring out the juice that collects in the internal container 23.

While the invention has been described in connection with various preferred embodiment, these are is not intended to limit the scope of the invention to the particular form set forth, but on the contrary, it is intended to cover such alternatives, modifications, and equivalents as may be within the spirit and scope of the invention as defined by the appended claims. Those skilled in the art will recognize that many variations are possible within the spirit and scope of the invention in which all terms are meant in their broadest, reasonable sense unless otherwise indicated. It should be particularly appreciated that the various alternative embodiments shown in FIG. 5-10 can be selectively combined to form additional embodiments which are intended to be embraced by the scope of the claims.

The terms, descriptions and figures used herein are set forth by way of illustration only and are not meant as limitations. Any headings utilized within the description are for convenience only and have no legal or limiting effect.

The invention claimed is:

1. A measuring cap, comprising:
   a) an inner threaded tube of a first vertical height having a closed upper surface and an opening at a bottom rim,
   b) an inclined annular surface extending downward a second vertical height from the bottom rim of said inner threaded cylinder, terminating at the first lower rim,
   c) a surrounding outer wall having an upper rim and second lower rim coupled to the first lower rim of the inclined annular surface in sealed connection thereto, and also having a third vertical height that is at least equal to the sum of the first and second vertical height to define an outer fluid containing vessel when the measuring cap is resting on the second lower rim,
   d) wherein the inner threaded cylinder and the inclined annular surface form an inner fluid containing vessel when the measuring and storage cap is resting on the upper rim wherein there is a hollow cavity between the inner threaded cylinder and the surrounding outer wall.

2. A measuring cap according to claim 1 wherein said inclined annular surface is marked with one or more volumetric graduations.

3. A measuring cap according to claim 1 further comprising a top that attaches to the upper rim to seal said outer fluid containing vessel.

4. A measuring cap according to claim 1 wherein the outer fluid containing vessel is subdivided into two or more chambers.

5. A measuring cap according to claim 4 further comprising a top that attaches to the upper rim to seal said outer fluid containing vessel.

6. A measuring cap according to claim 5 further comprising mirror on a least one surface of the top.

7. A measuring cap according to claim 5 wherein the top is tethered to the cap.

8. A measuring cap according to claim 4 wherein the top seals and isolates at least one of the two or more chambers.

9. A measuring cap according to claim 1 wherein the inclined annular surface has a concave upward shape when the cap is resting on the upper rim.

10. A measuring cap according to claim 1 wherein the surrounding outer wall is substantially cylindrical.

11. A measuring cap according to claim 3 wherein the top engages threads in the upper rim to engage therewith.

12. A measuring cap according to claim 3 wherein top fits snugly in the upper rim and the upper rim has one or more indentation that allow the top to be removed by urging the underside thereof upward from the one or more indentations.

13. A measuring cap according to claim 1 further wherein at least one of the upper and lower rim has a portion deformed to define a pouring spout for fluid.

14. A measuring cap according to claim 1 wherein the inclination angle of the inclined annular surface is at least 30°.

15. A measuring cap according to claim 1 wherein the inclination angle of the inclined annular surface is at least 40°.

16. A measuring cap according to claim 1 wherein the inclination angle of the inclined annular surface is at least 45°.

17. A measuring cap according to claim 12 wherein the inclined annular surface is marked with one or more volumetric graduation.

18. A measuring cap, comprising:
    a) an inner threaded cylinder of a first vertical height having a closed top and a bottom rim,
    b) an inclined annular surface extending downward a second vertical height from the bottom rim of said inner threaded cylinder, terminating at the first lower rim,
    c) a surrounding outer wall having an upper rim and second lower rim coupled to the lower rim of the inclined annular surface in sealed connection thereto, and also having a third vertical height that is at least equal to the sum of the first and second vertical heights, wherein the inner threaded cylinder and the inclined annular surface form an inner fluid containing vessel when the measuring and storage cap is resting on the upper rim,
    d) wherein said inclined annular surface is marked with one or more volumetric graduations on at least the side defining the inner fluid containing vessel wherein there is a hollow cavity between the inner threaded cylinder and the surrounding outer wall.

19. A measuring cap according to claim 18 wherein the space between the upper rim and the opposite side of the threads of the threaded cylinder is sealed.

20. A measuring and storage cap according to claim 18 wherein the inclined annular surface has a concave upward shape when the cap is resting on the upper rim.

21. A measuring cap according to claim 1 wherein said inner threaded tube, including the closed upper surface thereof, and a substantial portion of said inclined annular surface are covered by a convoluted cone having a generally circular base and an upper apex disposed below the upper rim of the surrounding outer wall, said convoluted cone having an outer surface facing said surrounding outer wall and forming an inner annular surface of the outer fluid containing vessel.

* * * * *